(12) United States Patent
Iwasaki et al.

(10) Patent No.: US 9,607,069 B2
(45) Date of Patent: Mar. 28, 2017

(54) TIME-DELAYED REPLICATION FOR DATA ARCHIVES

(71) Applicant: International Business Machines Corporation, Armonk, NY (US)

(72) Inventors: Norie Iwasaki, Fujisawa (JP); Katsuyoshi Katori, Kawasaki (JP); Koichi Masuda, Yokohama (JP); Tomokazu Nakamura, Kawasaki (JP); Takeshi Nohta, Tsukuba (JP); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/018,622

(22) Filed: Feb. 8, 2016

(65) Prior Publication Data

US 2016/0154872 A1 Jun. 2, 2016

Related U.S. Application Data

(63) Continuation of application No. 14/094,689, filed on Dec. 2, 2013, now Pat. No. 9,286,366.

(51) Int. Cl.
*G06F 17/00* (2006.01)
*G06F 17/30* (2006.01)

(52) U.S. Cl.
CPC .. *G06F 17/30581* (2013.01); *G06F 17/30073* (2013.01); *G06F 17/30079* (2013.01);
(Continued)

(58) Field of Classification Search
CPC ............ G06F 17/30073; G06F 17/30; G06F 17/30581; G06F 17/30575; G06F 17/30598;
(Continued)

(56) References Cited

U.S. PATENT DOCUMENTS 6,732,294 B2   5/2004   Mackrory et al.
7,302,540 B1   11/2007  Holdman et al.
(Continued)

OTHER PUBLICATIONS

Non-Final Office Action from U.S. Appl. No. 14/094,681, dated May 20, 2015.
(Continued)

*Primary Examiner* — Isaac M Woo
(74) *Attorney, Agent, or Firm* — Zilka-Kotab, PC (57) ABSTRACT

In one embodiment, a computer program product for time-delayed replication includes a computer readable storage medium having program instructions embodied therewith. The embodied program instructions are readable and/or executable by a processor to cause the processor to receive, by the processor, data to store to a first cluster. The embodied program instructions are also readable and/or executable by the processor to cause the processor to store, by the processor, one or more copies of the data to the first cluster. Moreover, the embodied program instructions are readable and/or executable by the processor to cause the processor to set, by the processor, a time-delayed copy consistency point, the time-delayed copy consistency point indicating an amount of time in which data stored to the first cluster is aged prior to being copied from the first cluster to a second cluster.

20 Claims, 8 Drawing Sheets

(52) U.S. Cl.
CPC .. *G06F 17/30085* (2013.01); *G06F 17/30312* (2013.01); *G06F 17/30575* (2013.01); *G06F 17/30598* (2013.01)

(58) Field of Classification Search
CPC ......... G06F 17/30079; G06F 17/30085; G06F 17/30312
USPC ................................................ 707/600–899
See application file for complete search history.

(56) References Cited

U.S. PATENT DOCUMENTS

| | | | |
|---|---|---|---|
| 7,644,046 | B1 | 1/2010 | Keeton et al. |
| 7,765,433 | B1 | 7/2010 | Krishnamurthy |
| 7,921,268 | B2 | 4/2011 | Jakob |
| 7,991,822 | B2 | 8/2011 | Bish et al. |
| 8,019,723 | B2 | 9/2011 | Bish et al. |
| 8,020,037 | B1 | 9/2011 | Schwartz et al. |
| 8,234,464 | B2 | 7/2012 | Bish et al. |
| 8,327,106 | B2 | 12/2012 | Peake et al. |
| 8,359,491 | B1 | 1/2013 | Bloomstein |
| 8,478,955 | B1 | 7/2013 | Natanzon et al. |
| 8,521,975 | B2 | 8/2013 | Bish et al. |
| 9,262,290 | B2 | 2/2016 | Iwasaki et al. |
| 9,286,366 | B2 | 3/2016 | Iwasaki et al. |
| 9,304,871 | B2 | 4/2016 | Iwasaki et al. |
| 2004/0059805 | A1* | 3/2004 | Dinker ................ G06F 11/2069 709/223 |
| 2012/0151273 | A1 | 6/2012 | Ben Or et al. |
| 2012/0290805 | A1 | 11/2012 | Bish et al. |
| 2012/0324183 | A1 | 12/2012 | Chiruvolu et al. |
| 2014/0215255 | A1 | 7/2014 | Zaheer |
| 2015/0154084 | A1 | 6/2015 | Iwasaki et al. |
| 2015/0154085 | A1 | 6/2015 | Iwasaki et al. |
| 2015/0154271 | A1 | 6/2015 | Iwasaki et al. |
| 2016/0140008 | A1 | 5/2016 | Iwasaki et al. |
| 2016/0154706 | A1 | 6/2016 | Iwasaki et al. |
| 2016/0154711 | A1 | 6/2016 | Iwasaki et al. |
| 2016/0154712 | A1 | 6/2016 | Iwasaki et al. |

OTHER PUBLICATIONS

Iwasaki et al., U.S. Appl. No. 14/094,681, filed Dec. 2, 2013.
Iwasaki et al., U.S. Appl. No. 14/094,684, filed Dec. 2, 2013.
Iwasaki et al., U.S. Appl. No. 14/094,689, filed Dec. 2, 2013.
Final Office Action from U.S. Appl. No. 14/094,681, dated Sep. 8, 2015.
Non-Final Office Action from U.S. Appl. No. 14/094,684, dated Sep. 8, 2015.
Non-Final Office Action from U.S. Appl. No. 14/094,689, dated Aug. 20, 2015.
Notice of Allowance from U.S. Appl. No. 14/094,681, dated Oct. 26, 2015.
Notice of Allowance from U.S. Appl. No. 14/094,689, dated Nov. 20, 2015.
Notice of Allowance from U.S. Appl. No. 14/094,684, dated Dec. 22, 2015.
Iwasaki et al., U.S. Appl. No. 15/006,873, filed Jan. 26, 2016.
Iwasaki et al., U.S. Appl. No. 15/006,931, filed Jan. 26, 2016.
Iwasaki et al., U.S. Appl. No. 15/018,480, filed Feb. 8, 2016.
Iwasaki et al., U.S. Appl. No. 15/018,540, filed Feb. 8, 2016.
Notice of Allowance from U.S. Appl. No. 15/018,540, dated Jun. 24, 2016.
Notice of Allowance from U.S. Appl. No. 15/018,540, dated Sep. 16, 2016.
Non-Final Office Action from U.S. Appl. No. 15/018,480, dated Jun. 23, 2016.
Notice of Allowance from U.S. Appl. No. 15/018,480, dated Sep. 30, 2016.

\* cited by examiner

TIME-DELAYED REPLICATION FOR DATA ARCHIVES

BACKGROUND

The present invention relates to data storage, and more particularly, to systems and methods configured to delay replication of data to a data archive for a period of time to enhance performance of data archive systems.

In a multi-cluster environment (e.g., a grid configuration), each cluster is capable of replicating data between sites based on a defined policy to meet each client's or user's established disaster recovery (DR) objective. For example, two clusters may be electronically connected via an Ethernet wide area network (WAN) and asynchronous volume replication to the remote site may be executed which allows status to be surfaced immediately, versus waiting for the replication to complete synchronously.

Each cluster (or site) may utilize a different technology, thus replication to a cluster or site may occur based on the needs of the client or user. For example, a cluster may have a physical tape back store (magnetic or optical) in which data targeting that site is intended to end up on physical tape. This physical tape back store may be intended to be used for long retention based archival data which should end up at a particular site or cluster. A grid architecture of a physical tape drive may also support an auto-removal function where aged data (data which has resided on a storage medium for a predetermined amount of time without access thereto) is automatically removed from random access storage configurations (such as disk-only-based storage configurations) after verifying that it has replicated to another cluster or site.

Essentially, the ability to replicate data to physical tape back stores and remove data from the random access storage configurations acts as a form of hierarchal storage management for physical tape within a grid. In addition, many clients or users have a minimal retention time for some types of data, yet they are not necessarily able to differentiate between data that will become long term archive versus data which will be kept for a shorter period of time. In many cases, only a small percentage of many workloads age long enough in order to justify replication of this data to an archive technology (e.g., a physical tape back store).

Typically, many clients or users prefer that data only remain in certain random access storage configured clusters or sites until it ages a certain number of days or weeks. Only then do the clients or users believe it is necessary to replicate this data to a physical tape back store for archival purposes. For data which does not have a long enough existence to be archived, storage space for this data is typically returned to scratch and expired long before it would ever become a candidate for automatic removal.

Therefore, the replication of data to a physical tape back store is excessive in these early expire cases from a viewpoint of the cache, physical tape, and network utilization, and simply introduces overhead when sufficient redundant copies of this data already exists in backup media in the random access storage configured clusters or sites.

BRIEF SUMMARY

In one embodiment, a computer program product for time-delayed replication includes a computer readable storage medium having program instructions embodied therewith. The embodied program instructions are readable and/or executable by a processor to cause the processor to receive, by the processor, data to store to a first cluster. The embodied program instructions are also readable and/or executable by the processor to cause the processor to store, by the processor, one or more copies of the data to the first cluster. Moreover, the embodied program instructions are readable and/or executable by the processor to cause the processor to set, by the processor, a time-delayed copy consistency point, the time-delayed copy consistency point indicating an amount of time in which data stored to the first cluster is aged prior to being copied from the first cluster to a second cluster.

In another embodiment, a computer program product for time-delayed replication includes a computer readable storage medium having program instructions embodied therewith. The embodied program instructions are readable and/or executable by a processor to cause the processor to set, by the processor, a time-delayed copy consistency point, the time-delayed copy consistency point indicating an amount of time in which data stored to a first cluster is aged prior to being copied from the first cluster to a second cluster.

Other aspects and embodiments of the present invention will become apparent from the following detailed description, which, when taken in conjunction with the drawings, illustrates by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

There are no methods capable of using replication as a form of long retention archiving to minimize replication and overhead incurred by a physical tape back store. It may be argued that the replication should simply occur prior to removal in a random access based storage configuration, but grid technologies are capable of absorbing data from host workloads faster than it is possible to replicate this data to peer clusters or sites. This means that inbound ingestion of data would be limited by a rate in which the data is replicated. This is unacceptable for any client or user of storage systems. Instead, the replication should occur later in time to account for early expiration, but soon enough before auto-removal would indicate the aged data as a candidate for removal. By waiting to perform replication until later in time results in less data to replicate, less bandwidth usage, less reclamation activity when data does potentially expire, and provides a method to automatically offload archival data to physical tape while keeping active, new data in random access based storage configurations (which may be disk-only storage).

In one general embodiment, an apparatus includes a processor and logic integrated with and/or executable by the processor, the logic being configured to cause the processor to receive data to store to a first cluster, store one or more copies of the data to the first cluster, and set a time-delayed copy consistency point, the time-delayed copy consistency point indicating an amount of time in which data stored to the first cluster is aged prior to being copied from the first cluster to a second cluster.

In another general embodiment, a method for time-delayed replication includes receiving data to store to a first cluster, storing one or more copies of the data to the first cluster, and setting a time-delayed copy consistency point, the time-delayed copy consistency point indicating an amount of time in which data stored to the first cluster is aged prior to being copied from the first cluster to a second cluster.

According to another general embodiment, a computer program product for time-delayed replication includes a computer readable storage medium having program code embodied therewith, the program code being readable and/or executable by a processor to receive data to store to a first cluster, store one or more copies of the data to the first cluster, and set a time-delayed copy consistency point, the time-delayed copy consistency point indicating an amount of time in which data stored to the first cluster is aged prior to being copied from the first cluster to a second cluster, wherein the time-delayed copy consistency point is relative to one of: a creation time of the data or a last access of the data, and wherein each cluster comprises one or more storage nodes representing a storage device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

Figure 1:
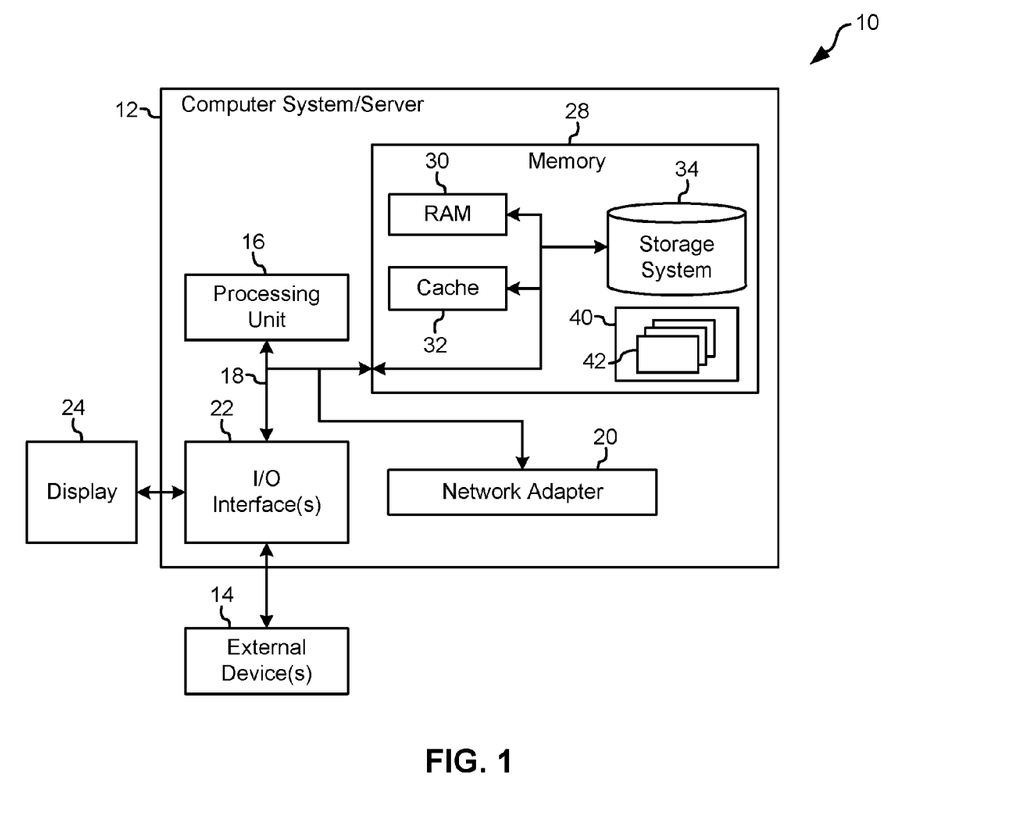
FIG. 1 illustrates a network storage system, according to one embodiment.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors 16 or processing units, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), an optical disk drive for reading from or writing to a removable, non-volatile optical disk such as a CD-ROM, DVD-ROM or other optical media, and/or a magnetic tape drive for reading from or writing to non-volatile magnetic tape provided in a removable tape cartridge may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
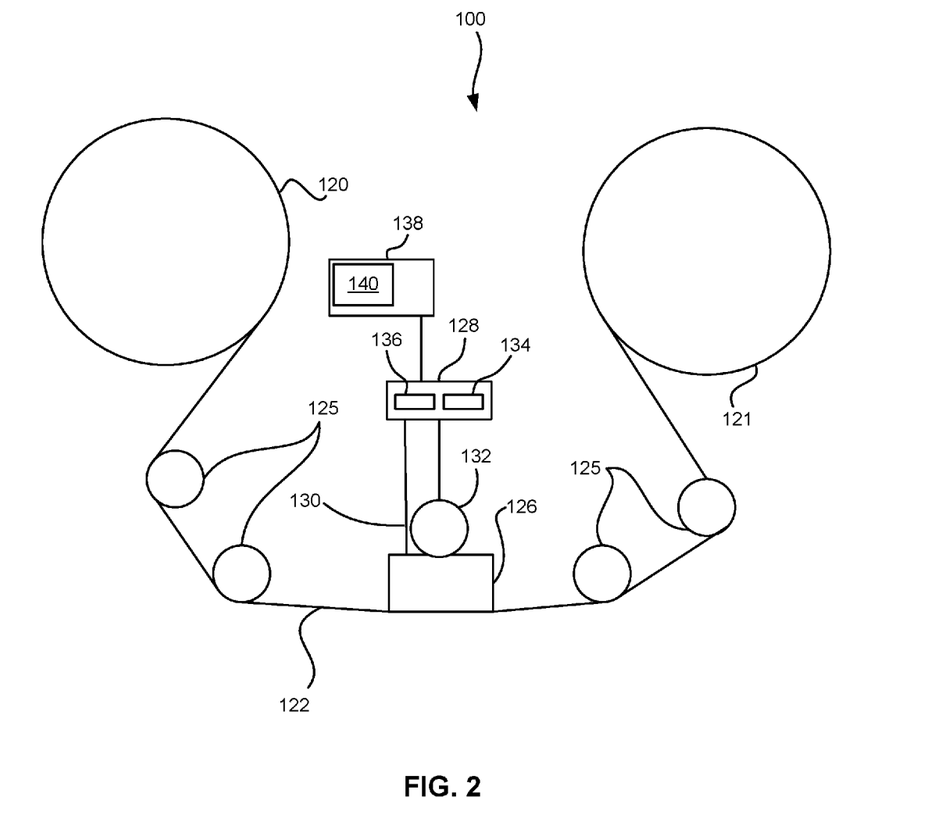
FIG. 2 illustrates a simplified tape drive of a tape-based data storage system, according to one embodiment.

FIG. 2 illustrates a simplified tape drive 100 of a tape-based data storage system, which may be employed according to various embodiments. While one specific implementation of a tape drive is shown in FIG. 2, it should be noted that the embodiments described herein may be implemented in the context of any type of tape drive system.

As shown, a tape supply cartridge 120 and a take-up reel 121 are provided to support a tape 122. One or more of the reels may form part of a removable cassette and are not necessarily part of the tape drive 100. The tape drive, such as that illustrated in FIG. 2, may further include drive motor(s) to drive the tape supply cartridge 120 and the take-up reel 121 to move the tape 122 over a tape head 126 of any type.

Guides 125 guide the tape 122 across the tape head 126. Such tape head 126 is in turn coupled to a controller assembly 128 via a cable 130. The controller 128 typically comprises a servo channel 134 and data channel 136 which includes data flow processing. It controls reel motion (not shown in FIG. 2) and head functions, such as track following, writing, reading, etc. The cable 130 may include read/write circuits to transmit data to the head 126 to be recorded on the tape 122 and to receive data read by the head 126 from the tape 122. An actuator 132 moves the head 126 to a set of tracks on the tape 122 in order to perform a write or a read operation.

In one embodiment, the tape drive 100 may comprise a data buffer 138 which is accessible by the tape drive 100 and the controller 128. This data buffer 138 may be split into one or more sections, with one section being a reserved data buffer 140 to be used for storage of partial data sets during reading operations from the tape 122.

An interface may also be provided for communication between the tape drive 100 and a host (integral or external) to send and receive the data and for controlling the operation of the tape drive 100 and communicating the status of the tape drive 100 to the host, as would be understood by one of skill in the art.

By using existing deferred copy consistency point(s), excessive replication of early-expiring volumes is not prevented because a deferred copy consistency point does not provide a method to control exactly when the replication occurs. It simply occurs as soon as possible, synchronously or asynchronously after creation, or when a source becomes available. Synchronous replication occurs in a rigid timeframe as the data is stored to the source storage medium, whereas asynchronous replication occurs when conditions allow for such replication, based on any number of parameters and/or factors, such as performance of the system, storage space, timing, etc. To solve this existing issue, it is proposed to utilize time delayed copy consistency points, as described herein according to various embodiments.

The lack of a mechanism to control exactly when the deferred replication is started is a problem with conventional systems. In a situation where the volume is already expired when the replication starts, the replication may be skipped and an associated replication job may be eliminated, thus excessive replication of the early-expiring volumes does not occur. In addition, the lack of replication also means that any copy of the data on a physical tape back store does not require expiration (since it does not exist) which may produce fragmentation within the back store resulting in the need to reclaim physical media space to correct the situation.

In order to achieve this mechanism, a new copy consistency point "T" may be used which represents "Time Delayed Replication," in addition to already existing copy consistency points. Two new properties of the copy consistency point "T," "Time Delay" and "Delay Reference," are defined along with the "T" copy consistency point initially. With this new time delayed copy consistency point, the data is only replicated after it ages for a predetermined amount of time and therefore is less likely to expire before it becomes a candidate for removal (deletion from the cluster). This greatly reduces copy traffic on a network at a client or user site, in addition to reducing excessive migration/reclamation activity on physical tape back store clusters (or some other form of backup data storage known in the art). Therefore, effective use of finite resources (cache/random access memory/physical tape memory/network) is more achievable than using existing copy consistency points.

In one embodiment, a Management Interface (MI) may cause a Management Classes setting page to surface or display where a user may select one or more "T" copy consistency points with additional properties: "Time Delay" and "Delay Reference." The "Time Delay" property indicates a time duration which must pass before the copy related to the one or more "T" copy consistency points are actually copied to its intended destination(s). The "Delay Reference" property is a time marker or point in time to which the "Time Delay" is relative, such as time zero, with the counter beginning from this "Delay Reference" point in time. According to several embodiments, a "Volume Creation" time/date, a "Volume Access" time/date, or some other suitable time/date reference may be used. can be selected. The "Volume Creation" is a point in time when the data was created on the source cluster. The "Volume Access" is a point in time when the data on the source cluster or some other location within the entire configuration was accessed, either first accessed, last accessed, accessed with a particular frequency, or any other access time/date known in the art.

A data's "Time Delay" property may be based on the data's (or data set, volume, file, or some other organizational structure of the data) creation time/date when the "Volume Creation" property is selected and the "Time Delay" property is relative to the data's (earliest, latest, most frequent, etc.) access time/date when the "Volume Access" property is selected.

By using these two properties in combination, a user is able to control exactly how much time will pass, as indicated by the "Time Delay," before the replication of the data occurs, with respect to an established time/date indicated by the "Delay Reference."

Figure 3:
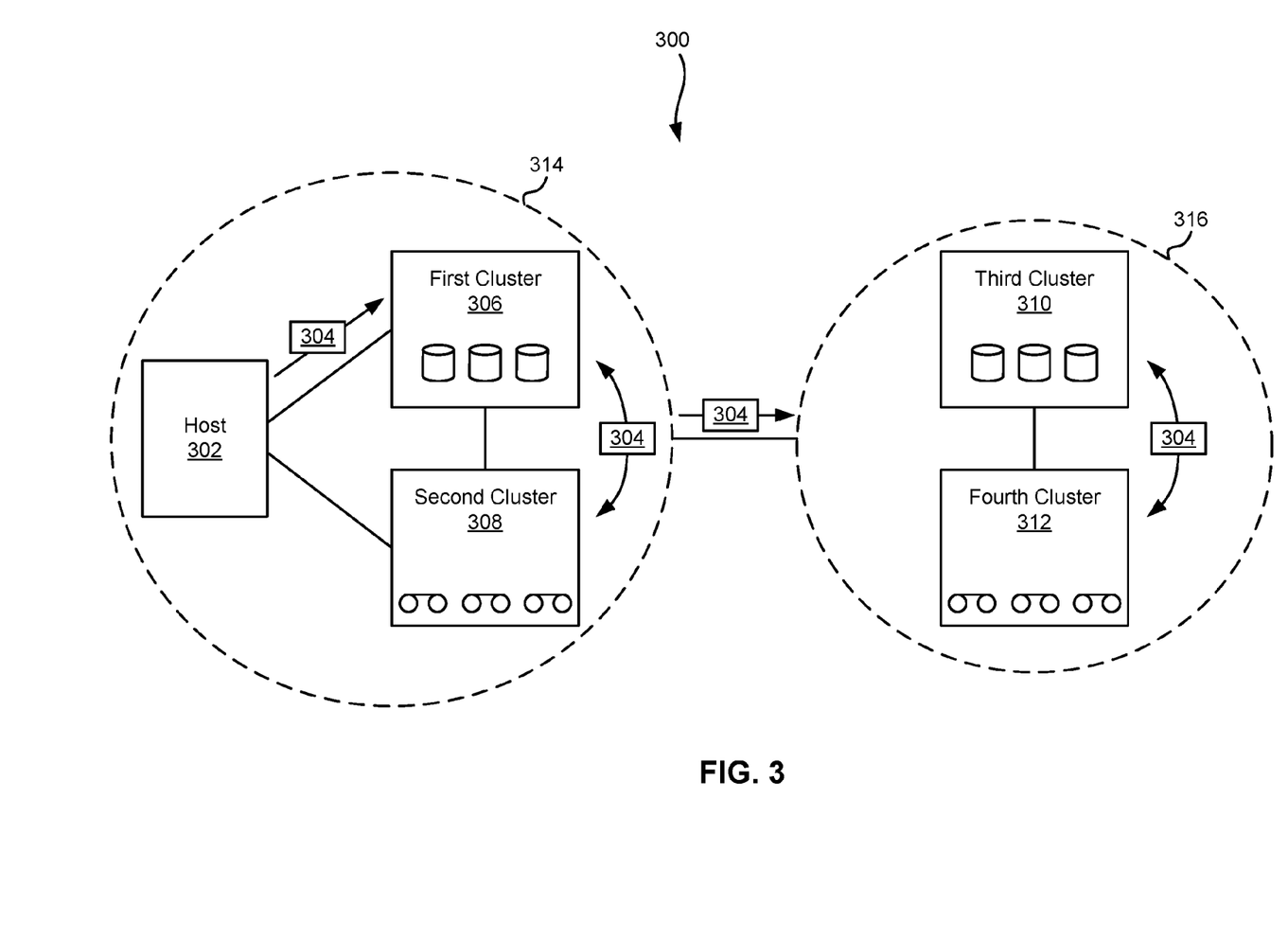
FIG. 3 shows a system for replicating data, according to one embodiment.

According to one example, with reference to FIG. 3, a system 300 is shown for deferred replication of data 304 having a four-way grid configuration. In FIG. 3, a host 302 sends data 304 to a first cluster 306, where the first cluster 306 stores the data 304, such as to random access storage media, like HDDs, flash memory, cache, or some other suitable storage media.

In this example, by using a "Deferred" copy consistency point, the data is copied to a second cluster 308, a third cluster 310, and a fourth cluster 312 either synchronously (immediately) or asynchronously (with conflict checks to ensure the data is still consistent), according to system performance characteristics and network usage profiles and conditions. The second and fourth clusters 308, 312 start data 304 migration once the replication from the first site 314 (such as a production site or some other suitable site type known in the art) to the second site 316 (such as a data replication site or some other suitable site type known in the art which is remote from or otherwise distinct from the production site) has been performed.

In this example, to point out a problem with this scheme, assume that the host 302 expires or otherwise marks for deletion the data 304 early, e.g., it is expired prior to being fully replicated or soon thereafter, thereby indicating that the data 304 was not important to the user and possibly only temporal.

As previously described, many users or customers prefer that the data only remain in certain clusters or sites (e.g., the first cluster 306) until it ages a certain number amount of time (such as a few days, weeks, etc.), at which point the data is considered to be important enough to replicate the data to the other clusters or sites (e.g., the second cluster 308). Since in conventional systems there is no mechanism to control when the deferred replication starts, it is impossible using current systems to ensure delay of the replication until the host expires the volume earlier.

Now referring to FIGS. 4A-4D, a system 400 for time-delayed replication of data 404 is shown having a four-way grid configuration, with a first cluster 406 and a second cluster 408 at a first site 414, and a third cluster 410 and a fourth cluster 412 at a second site 416. Each cluster in the grid comprises one or more storage nodes representing a storage device. Of course, more or less clusters or sites, different media types, different timing structures, different grid configurations, etc., may be used in system 400 without departing from the embodiments and approaches described herein.

Figure 4A:
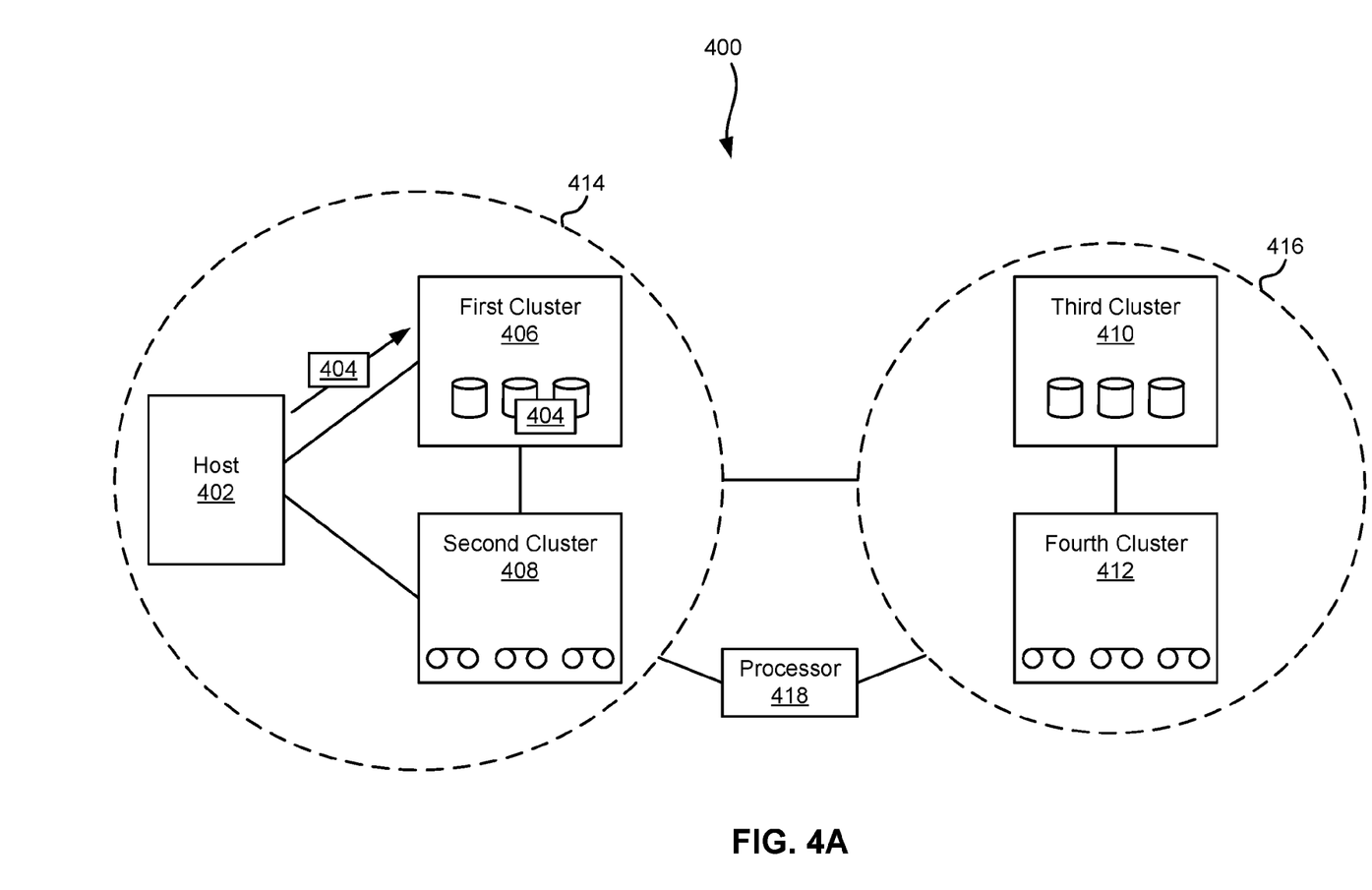
FIGS. 4A-4D show a system for time-delayed data replication, according to one embodiment.

In FIG. 4A, a host 402 sends data 404 to a first cluster 406, where the first cluster 406 stores the data 404, such as to random access storage media, like HDDs, flash memory, cache, or some other suitable storage media. In various embodiments, the first cluster 406 may comprise a plurality of random access storage media, a plurality of sequential access storage media, or a combination thereof, such as HDDs, tape drives, optical drives, flash memory, etc.

This first cluster 406 may include any type of storage device known in the art, such as an IBM TS7720 or some other suitable storage device comprising a plurality of storage media.

In various embodiments, the second cluster 408 may comprise a plurality of random access storage media, a plurality of sequential access storage media, or a combination thereof, such as HDDs, tape drives, optical drives, flash memory, etc. In a specific embodiment, the second cluster 408 may comprise a physical tape back store as would be understood by one of skill in the art. In this physical tape back store, the data 404 may be stored to a physical tape or some other type of memory storage known in the art.

This second cluster 408 may be any type of storage device known in the art, such as an IBM TS7740 or some other suitable storage device comprising a plurality of storage media.

In this way, according to one embodiment, the first cluster 406 may comprise a plurality of random access storage media and the second cluster 408 may comprise a physical tape back store. In this embodiment, the data on the first cluster 406 is stored to a random access storage medium of the first cluster 406, and the data on the second cluster 408 is stored to a physical tape of the second cluster 408.

Figure 4B:
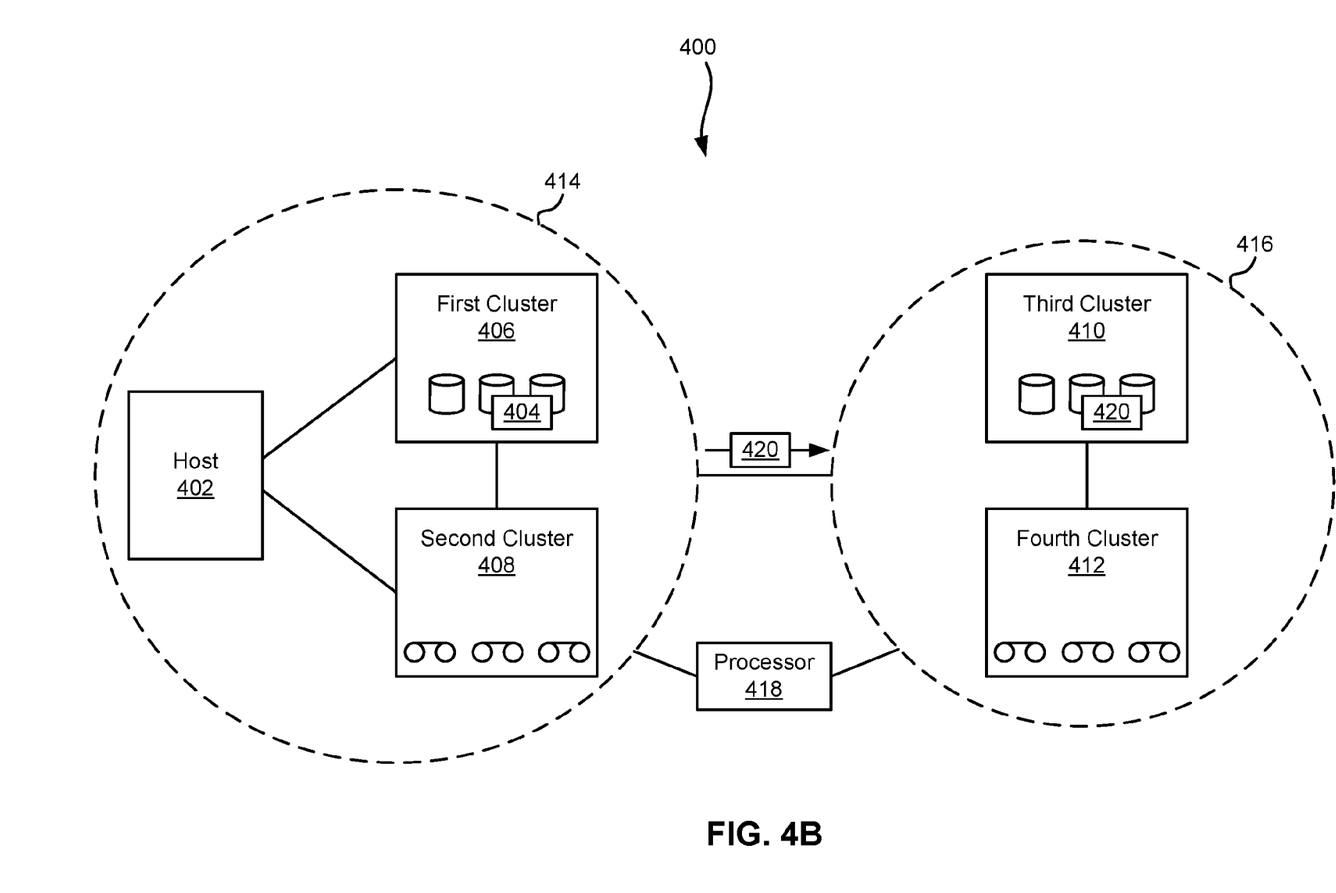

Then, as shown in FIG. 4B, by using a "Deferred" copy consistency point, the third cluster 410 receives one or more copies 420 of the data 404 to write. However, in this embodiment, the second cluster 408 and the fourth cluster 412 do not receive the data 404, 420 to be copied immediately.

Figure 4C:
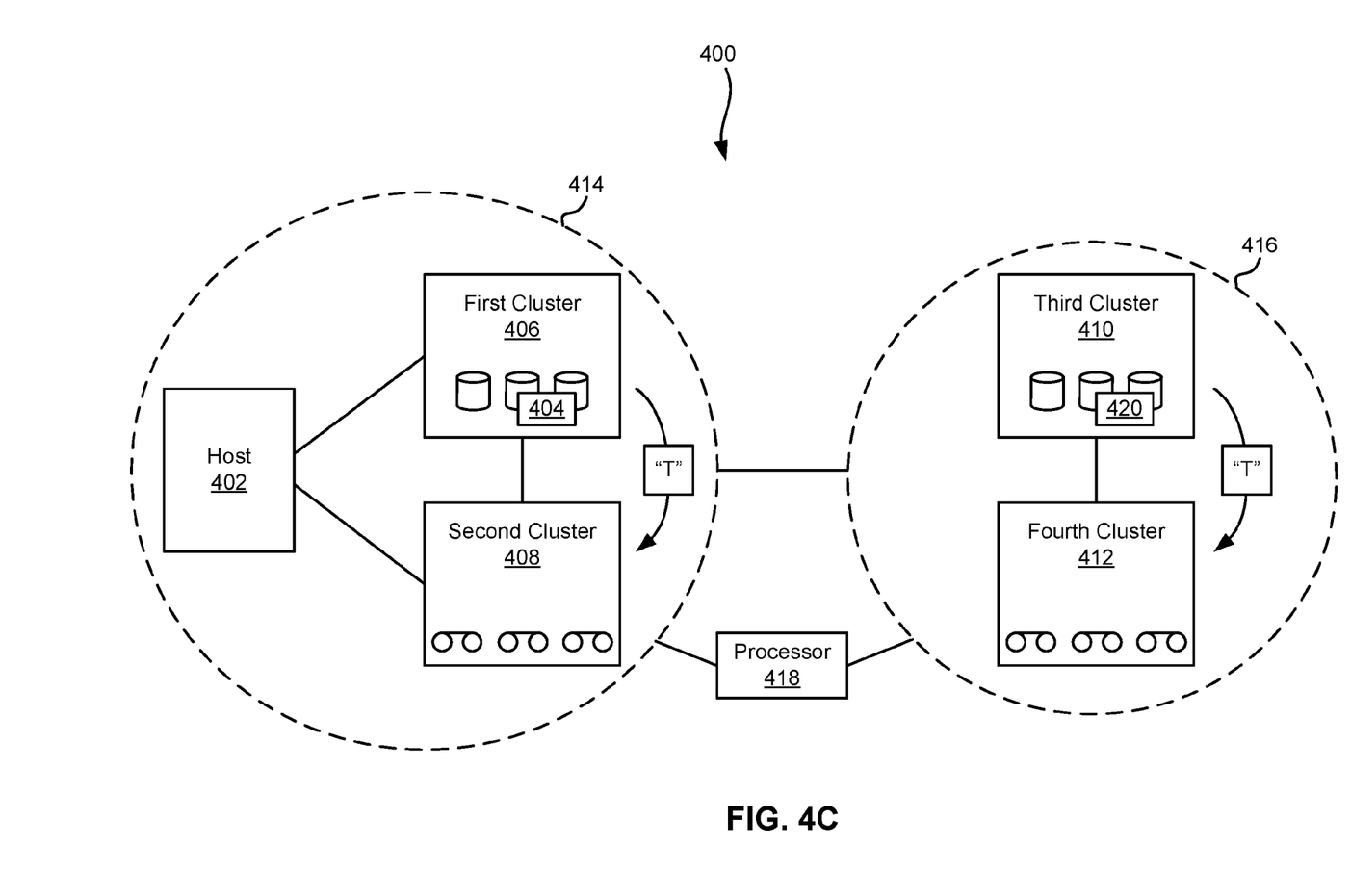

Instead, as shown in FIG. 4C, these clusters 408, 412 are provided with a "T" copy consistency point, so that the replication will not start until a determined, established, or indicated "Time Delay" has passed since an determined, established, or indicated "Delay Reference." The "Time Delay" and/or the "Delay Reference" may each be set by a user, automatically, by default, or according to any set of parameters and/or characteristics of the system 400, as would be understood by one of skill in the art upon reading the present descriptions.

Assume for on example that before the "Time Delay" passes or is achieved, and the replication has not yet occurred to the second cluster 408 and the fourth cluster 412, that the host 402 expires the data 404. In this example, when the replication is scheduled to start on the second cluster 408 and the fourth cluster 412 (e.g., the "Time Delay" has occurred) this replication operation is skipped and the copy job is discarded. No copy of the data 404 is made over the network and no additional migration and/or reclamation to the media of the second cluster 408 and the fourth cluster 412 occurs, which is very beneficial when these clusters rely on physical tapes.

Figure 4D:
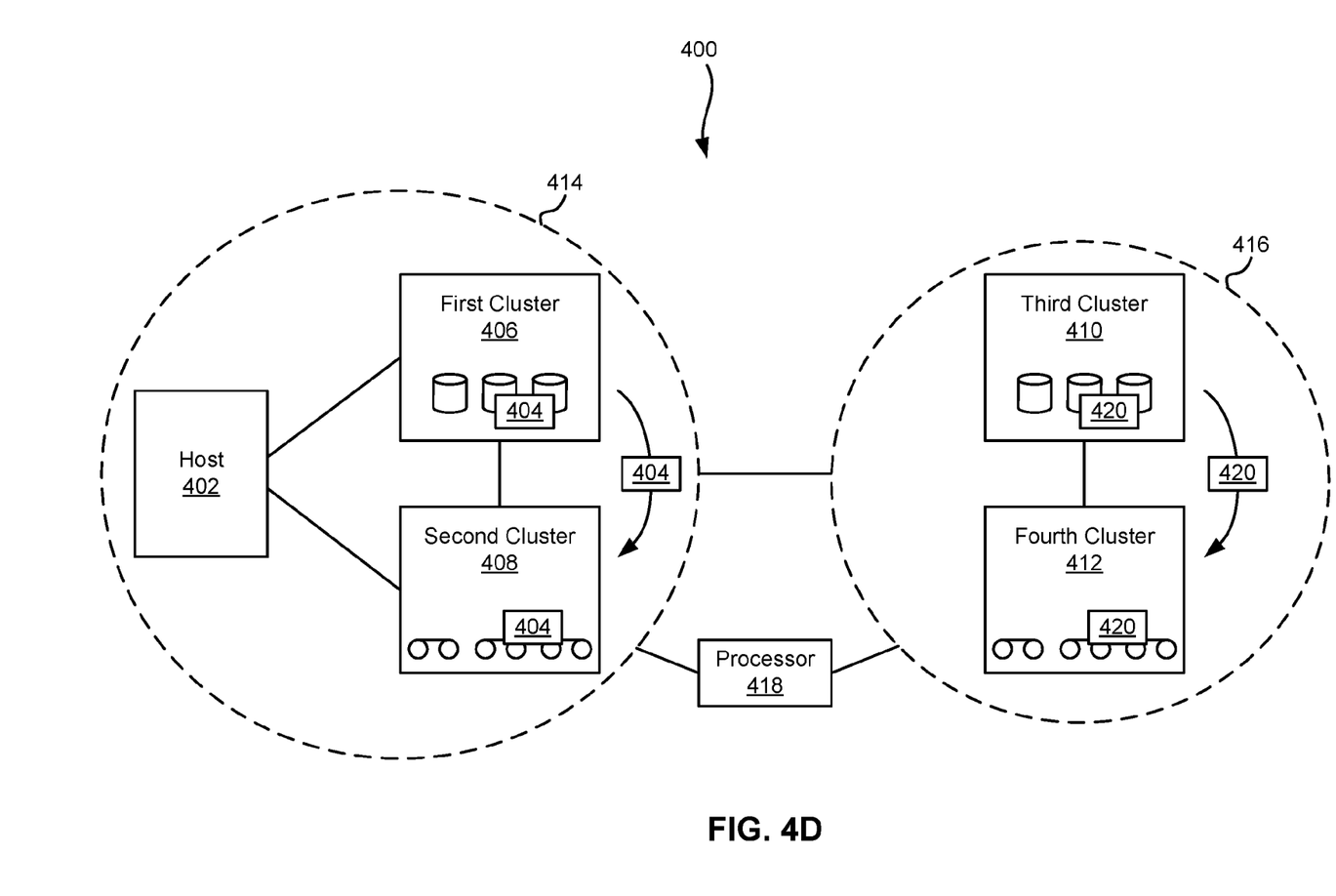

In another example, as shown in FIG. 4D, assume that the host 402 does not expire the data 404, and then the "Time Delay" passes. The replication of the data 404 occurs on the second cluster 408 and the replication of the data 420 occurs on the fourth cluster 412, eventually, according to conditions allowing such a copy to be made. If the cache is fully being filled on the first cluster 406 and/or the third cluster 410, one or more of these clusters may start removing data 404, 420 in the cache. This does not present a problem because it has already been replicated from the first cluster 406 to the second cluster 408 (and likewise from the third cluster 410 to the fourth cluster 412).

By using this mechanism, the client or user is able to avoid replication of any early-expiring data across the clusters in the grid, thus the effective use of the resources (cache/physical tapes/network) is achieved.

In order to effect the time-delayed data replication, the system 400 may comprise a processor 418 and logic integrated with and/or executable by the processor 418. The processor 418 may be any processor known in the art, such as a microprocessor, CPU, FPGA, ASIC, etc., and may be part of a controller, management system, server, or some other device capable of providing the described functionality.

The logic is configured to cause the processor 418 to receive data 404 to store to a first cluster 406, store one or more copies of the data 404 to the first cluster, store one or more copies 420 of the data to a third cluster 410, and set a time-delayed copy consistency point, the time-delayed copy consistency point indicating an amount of time in which data 404 stored to the first cluster 406 is aged prior to being copied from the first cluster 406 to a second cluster 408.

In one embodiment, the time-delayed copy consistency point may be relative to one of: a creation time of the data 404, a last access of the data 404, a first access of the data 404, etc.

According to another embodiment, the logic may be further configured to cause the processor 418 to copy the data 404 stored to the first cluster 406 to the second cluster 408 when the time-delayed copy consistency point occurs and a request to expire the data 404 stored to the first cluster 406 is not received prior to the time-delayed copy consistency point having occurred. In other words, the data 404 is copied to the second cluster 408 unless the data 404 is expired prior to the time delay being achieved, regardless of how the time delay is calculated.

In another embodiment, the logic may be further configured to cause the processor 418 to receive a request to expire the data 404 stored to the first cluster 406 prior to the time-delayed copy consistency point having occurred, and skip a copy operation to copy the data 404 stored to the first cluster 406 to the second cluster 408 when the time-delayed copy consistency point occurs such that the data 404 stored to the first cluster 406 is not copied to the second cluster 408.

In accordance with another embodiment, the logic may be configured to cause the processor 418 to set a second time-delayed copy consistency point for the third cluster 410, the second time-delayed copy consistency point indicating an amount of time in which the one or more copies 420 of the data stored to the third cluster 410 is aged prior to being copied from the third cluster 410 to a fourth cluster 412, and copy the one or more copies 420 of the data stored to the third cluster 410 to the fourth cluster 412 when the second time-delayed copy consistency point occurs, is reached, has expired, etc.

In one embodiment, the third cluster 410 may comprise a plurality of random access storage media and the fourth cluster 412 may comprise a physical tape back store. In this embodiment, the data on the third cluster 410 is stored to a random access storage medium of the third cluster 410, and the data on the fourth cluster 412 is stored to a physical tape of the fourth cluster 412.

In a further embodiment, the logic may be further configured to cause the processor 418 to receive a request to expire the data 404 stored to the third cluster 410 prior to the second time-delayed copy consistency point having occurred, and skip a copy operation to copy the data 404 stored to the third cluster 410 to the fourth cluster 412 when the second time-delayed copy consistency point occurs such that the data 404 stored to the third cluster 410 is not copied to the fourth cluster 412.

In one approach, the logic may be further configured to cause the processor 418 to determine that an amount of storage space remaining on the first cluster 406 is less than a predetermined threshold, and remove any data from the first cluster 406 that has been copied to the second cluster 408 in order to increase available storage space on the first cluster 406. The threshold may represent any value, such as an amount of free space, an amount of data stored, a number of free tracks, a percentage of total or partial storage space, etc.

In a further embodiment, the logic may be configured to cause the processor 418 to determine that no further data remains on the first cluster 406 that has been copied to the second cluster 408 and the amount of storage space remaining on the first cluster 406 is still less than the predetermined threshold, and copy a predetermined amount of the data 404 stored to the first cluster 406 to the second cluster 408 prior to the data 404 aging to the time-delayed copy consistency point in order to remove additional data from the first cluster 406.

By providing the above described functionality, archive content may gravitate towards nodes/clusters/sites as desired, thereby providing an automated way to use replication as a form of hierarchal storage management and/or tiering across remote sites.

Figure 5:
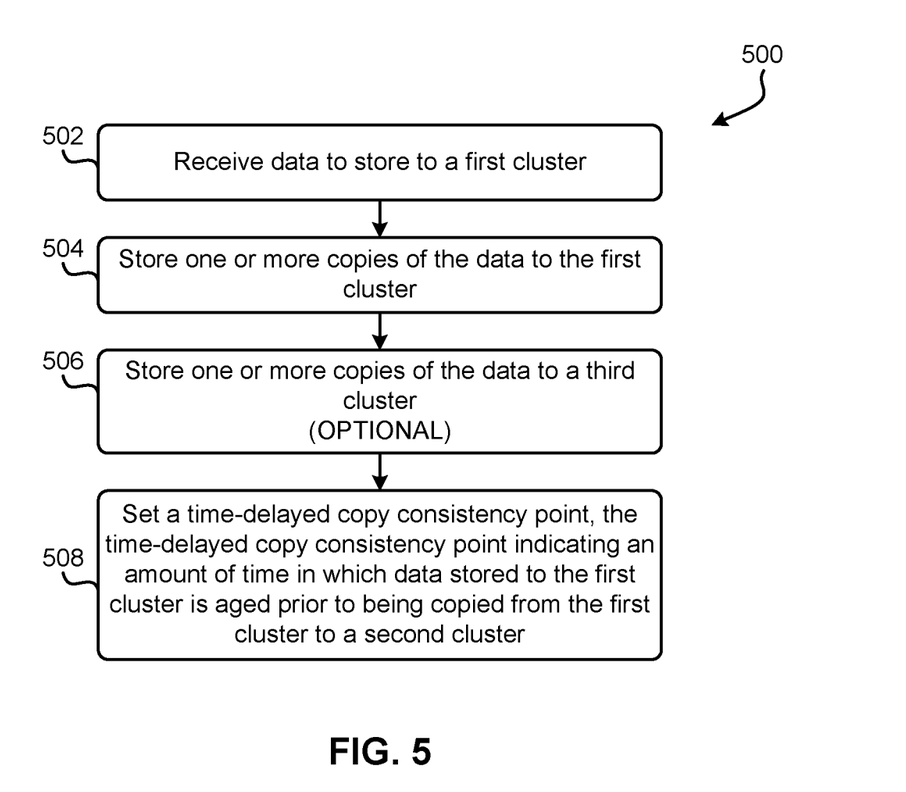
FIG. 5 shows a method, according to one embodiment.

Now referring to FIG. 5, a method 500 for time-delayed replication is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various non-limiting embodiments, the method 500 may be partially or entirely performed by a tape drive, a hard disk drive, an optical drive, a controller, a hierarchal storage manager, a storage library manager, a processor (such as a CPU, an ASIC, a FPGA, etc.) which may be embedded in and/or operate within a system, etc.

As shown in FIG. 5, method 500 may initiate with operation 502, where data to store to a first cluster is received, e.g., from a host, server, manager, controller, etc. The data may be in any form, such as one or more data sets, files, volumes, etc.

In operation 504, one or more copies of the data is stored to the first cluster. The storage may be executed according to any method known in the art. Each of the one or more copies may remain on the first cluster or may be sent to other storage sites, as desired.

In optional operation 506, one or more copies of the data is stored, synchronously or asynchronously, to a third cluster. The timing of this copy of the data is determined by conditions and/or characteristics of the storage system having the first and third clusters, as would be understood by one of skill in the art.

Each cluster comprises one or more storage nodes representing a storage device. Furthermore, any type of storage media may be used on any of the storage nodes, such as random access storage media (HDDs, flash memory, etc.), sequential access storage media (tape drives, some optical drives, etc.), or some combination thereof.

In operation 508, a time-delayed copy consistency point is set, such as by a user, automatically according to some conditions or desires of the user, by default, etc. The time-delayed copy consistency point indicates an amount of time in which data stored to the first cluster is aged prior to being copied from the first cluster to a second cluster, thereby delaying the copy of the data.

In one embodiment, the time-delayed copy consistency point may be relative to one of: a creation time of the data, a last access of the data, a first access of the data, a frequency access of the data (a time when the data was most frequently accessed), a least frequent access of the data (a time when the data was least frequently accessed), etc.

The method 500 may further comprise setting a second time-delayed copy consistency point for the third cluster, the second time-delayed copy consistency point indicating an amount of time in which data stored to the third cluster is aged prior to being copied from the third cluster to a fourth cluster. Also, method 500 may include copying the data stored to the third cluster to the fourth cluster when the second time-delayed copy consistency point occurs, similar to the mechanism described above between the first and second clusters, in one approach. The second time consistency point may be the same or different than the time consistency point used for copying data from the first cluster, and may be set by a user or determined automatically based on any number of conditions and/or parameters to cause better performance of the system.

In another further embodiment, the method 500 may include copying the data stored on the first cluster to the second cluster when the time-delayed copy consistency point occurs and a request to expire the data stored on the first cluster is not received prior to the time-delayed copy consistency point having occurred.

According to another embodiment, method 500 may include receiving a request to expire the data stored to the first cluster prior to the time-delayed copy consistency point having occurred and skipping a copy operation to copy the data stored to the first cluster to the second cluster when the time-delayed copy consistency point occurs such that the data stored to the first cluster is not copied to the second cluster. This reduces resource usage of the system, the network, and individual devices and storage resources in the system, as would be understood by one of skill in the art.

In yet another embodiment, method 500 may include determining that an amount of storage space remaining on the first cluster is less than a predetermined threshold and removing any data from the first cluster that has been copied to the second cluster in order to increase available storage space on the first cluster. In this way, when data has aged long enough to be copied to the second cluster (or, likewise, from the third cluster to the fourth cluster), space may be freed up on the first cluster (or, likewise, on the third cluster) by removing the data that has already been moved to another storage node or cluster, thereby ensuring that the data is available should a user or customer attempt to access it, but the data is not tying up resources on the first (or third) cluster.

According to a further embodiment, method 500 may include determining that no further data remains on the first cluster that has been copied to the second cluster and that the amount of storage space remaining on the first cluster is still less than the predetermined threshold. In other words, all data that has already been copied to the second (or fourth) cluster has already been deleted or removed from the first (or third) cluster, and other options should be explored for freeing up space.

In one such option, a predetermined amount of the data stored on the first (or third) cluster is copied to the second (or fourth) cluster prior to the data aging to the time-delayed copy consistency point in order to remove additional data from the first (or third) cluster. Once the data is copied to the second (or fourth) cluster (even though it has not aged sufficiently to automatically be copied) it may be removed from the first (or third) cluster, thereby freeing up space.

In this way, even when data has not aged long enough to be copied to the second cluster (or, likewise, from the third cluster to the fourth cluster), space may be freed up on the first cluster (or, likewise, on the third cluster) by copying the data that is closest to reaching the "Time Delay," as described previously.

Method 500 may be executed, implemented in, and/or available to be performed using a system, apparatus, and/or computer program product, according to various embodiments.

According to one embodiment, an apparatus may include a processor (such as a hardware and/or software processor alone or in combination with the hardware processor) and logic integrated with and/or executable by the processor. The logic may be software-based, hardware-based, and/or a combination thereof according to various approaches. Execution of the logic may cause the processor to perform method 500 or some portion thereof.

In another embodiment, a computer program product may include a computer readable storage medium having program code embodied therewith, the program code being readable and/or executable by a processor. The processor may be implemented in hardware and/or software alone or in combination, and execution of the program code may cause the processor to perform method 500 or some portion thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product for time-delayed replication, the computer program product comprising a computer readable storage medium having program instructions embodied therewith, the embodied program instructions being readable and/or executable by a processor to cause the processor to:
   receive, by the processor, data to store to a first cluster;
   store, by the processor, one or more copies of the data to the first cluster; and
   set, by the processor, a time-delayed copy consistency point, the time-delayed copy consistency point indicating an amount of time in which data stored to the first cluster is aged prior to being copied from the first cluster to a second cluster.

2. The computer program product as recited in claim 1, wherein the time-delayed copy consistency point is relative to one of: a creation time of the data or a last access of the data.

3. The computer program product as recited in claim 1, wherein each cluster comprises one or more storage nodes representing a storage device.

4. The computer program product as recited in claim 1, wherein the first cluster comprises a plurality of random access storage media and the second cluster comprises a physical tape back store, wherein the data is stored to a random access storage medium of the first cluster, and wherein the data is stored to a physical tape of the second cluster.

5. The computer program product as recited in claim 1, wherein the embodied program instructions are readable and/or executable by the processor to cause the processor to:
   store, by the processor, one or more copies of the data to a third cluster;
   set, by the processor, a second time-delayed copy consistency point for the third cluster, the second time-delayed copy consistency point indicating an amount of time in which data stored to the third cluster is aged prior to being copied from the third cluster to a fourth cluster; and copy, by the processor, the data stored to the third cluster to the fourth cluster when the second time-delayed copy consistency point occurs.

6. The computer program product as recited in claim 5, wherein the third cluster comprises a plurality of random access storage media and the fourth cluster comprises a physical tape back store, wherein the data is stored to a random access storage medium of the third cluster, and wherein the data is stored to a physical tape of the fourth cluster.

7. The computer program product as recited in claim 1, wherein the embodied program instructions are readable and/or executable by the processor to cause the processor to copy, by the processor, the data stored to the first cluster to the second cluster when the time-delayed copy consistency point occurs and a request to expire the data stored to the first cluster is not received prior to the time-delayed copy consistency point having occurred.

8. The computer program product as recited in claim 1, wherein the embodied program instructions are readable and/or executable by the processor to cause the processor to:
receive, by the processor, a request to expire the data stored to the first cluster prior to the time-delayed copy consistency point having occurred; and
skip, by the processor, a copy operation to copy the data stored to the first cluster to the second cluster when the time-delayed copy consistency point occurs such that the data stored to the first cluster is not copied to the second cluster.

9. The computer program product as recited in claim 1, wherein the embodied program instructions are readable and/or executable by the processor to cause the processor to:
determine, by the processor, that an amount of storage space remaining on the first cluster is less than a predetermined threshold; and
remove, by the processor, any data from the first cluster that has been copied to the second cluster in order to increase available storage space on the first cluster.

10. The computer program product as recited in claim 9, wherein the embodied program instructions are readable and/or executable by the processor to cause the processor to:
determine, by the processor, that no further data remains on the first cluster that has been copied to the second cluster and the amount of storage space remaining on the first cluster is still less than the predetermined threshold; and
copy, by the processor, a predetermined amount of the data stored on the first cluster to the second cluster prior to the data aging to the time-delayed copy consistency point in order to remove additional data from the first cluster.

11. A computer program product for time-delayed replication, the computer program product comprising a computer readable storage medium having program instructions embodied therewith, the embodied program instructions being readable and/or executable by a processor to cause the processor to:
set, by the processor, a time-delayed copy consistency point, the time-delayed copy consistency point indicating an amount of time in which data stored to a first cluster is aged prior to being copied from the first cluster to a second cluster.

12. The computer program product as recited in claim 11, wherein the time-delayed copy consistency point is relative to one of: a creation time of the data or a last access of the data.

13. The computer program product as recited in claim 11, wherein each cluster comprises one or more storage nodes representing a storage device.

14. The computer program product as recited in claim 13, wherein the first cluster comprises a plurality of random access storage media and the second cluster comprises a physical tape back store, wherein the data is stored to a random access storage medium of the first cluster, and wherein the data is stored to a physical tape of the second cluster.

15. The computer program product as recited in claim 11, wherein the embodied program instructions are readable and/or executable by the processor to cause the processor to:
set, by the processor, a second time-delayed copy consistency point for a third cluster, the second time-delayed copy consistency point indicating an amount of time in which data stored to the third cluster is aged prior to being copied from the third cluster to a fourth cluster.

16. The computer program product as recited in claim 15, wherein the embodied program instructions are readable and/or executable by the processor to cause the processor to:
copy, by the processor, the data stored to the third cluster to the fourth cluster when the second time-delayed copy consistency point occurs.

17. The computer program product as recited in claim 11, wherein the embodied program instructions are readable and/or executable by the processor to cause the processor to:
copy, by the processor, the data stored to the first cluster to the second cluster when the time-delayed copy consistency point occurs.

18. A computer program product for time-delayed replication, the computer program product comprising a computer readable storage medium having program instructions embodied therewith, the embodied program instructions being readable and/or executable by a processor to cause the processor to:
receive, by the processor, data to store to a first cluster;
store, by the processor, one or more copies of the data to the first cluster; and
set, by the processor, a time-delayed copy consistency point, the time-delayed copy consistency point indicating an amount of time in which data stored to the first cluster is aged prior to being copied from the first cluster to a second cluster,
wherein the time-delayed copy consistency point is relative to a creation time of the data or a last access of the data.

19. The computer program product as recited in claim 18, wherein the embodied program instructions are readable and/or executable by the processor to cause the processor to:
store, by the processor, one or more copies of the data to a third cluster;
set, by the processor, a second time-delayed copy consistency point for the third cluster, the second time-delayed copy consistency point indicating an amount of time in which data stored to the third cluster is aged prior to being copied from the third cluster to a fourth cluster; and
copy, by the processor, the data stored to the third cluster to the fourth cluster when the second time-delayed copy consistency point occurs.

20. The computer program product as recited in claim 19, wherein the third cluster comprises a plurality of random access storage media and the fourth cluster comprises a physical tape back store, wherein the data is stored to a random access storage medium of the third cluster, and wherein the data is stored to a physical tape of the fourth cluster.

* * * * *